United States Patent
Schreiber

(10) Patent No.: US 8,419,837 B2
(45) Date of Patent: Apr. 16, 2013

(54) AIR FILTRATION SYSTEM WITH QUICK CONNECT

(75) Inventor: Kevin J. Schreiber, Happy Valley, OR (US)

(73) Assignee: Huntair, Inc., Tualatin, OR (US)

( * ) Notice: Subject to any disclaimer, the term of this patent is extended or adjusted under 35 U.S.C. 154(b) by 110 days.

(21) Appl. No.: 13/012,935

(22) Filed: Jan. 25, 2011

(65) Prior Publication Data

US 2011/0219953 A1    Sep. 15, 2011

Related U.S. Application Data

(60) Provisional application No. 61/311,974, filed on Mar. 9, 2010.

(51) Int. Cl.
  *B01D 46/00*    (2006.01)
(52) U.S. Cl.
  USPC ............. 95/273; 55/385.2; 55/467; 55/471; 454/187
(58) Field of Classification Search ............. 55/385.2, 55/471, 473, 480, 482, 505; 454/187, 228, 454/236, 292, 296, 338
  See application file for complete search history.

(56) References Cited

U.S. PATENT DOCUMENTS

| | | | |
|---|---|---|---|
| 2,951,717 A | 9/1960 | Zaber | |
| 3,618,988 A | 11/1971 | Zurmuehlen | |
| 3,676,986 A * | 7/1972 | Reiling | 55/472 |
| 4,932,988 A | 6/1990 | Lutterbach | |
| 4,955,997 A * | 9/1990 | Robertson, III | 96/138 |
| 5,151,063 A * | 9/1992 | Tanaka et al. | 454/258 |
| 5,279,090 A | 1/1994 | Yamaguchi | |
| 5,294,236 A * | 3/1994 | Baird | 96/416 |
| 5,725,426 A | 3/1998 | Alvarez | |
| 6,050,774 A | 4/2000 | LeBaron | |
| 6,174,341 B1 * | 1/2001 | Burge | 55/385.2 |
| 6,321,637 B1 * | 11/2001 | Shanks et al. | 95/273 |
| 6,328,776 B1 * | 12/2001 | Shanks et al. | 55/385.2 |
| 6,402,798 B1 * | 6/2002 | Kallsen et al. | 55/385.3 |
| 6,471,582 B1 * | 10/2002 | Tucker | 454/187 |
| 6,572,468 B1 | 6/2003 | Sasaki | |
| 6,602,128 B1 | 8/2003 | Spengler | |
| 6,709,474 B2 * | 3/2004 | Zaffetti et al. | 55/320 |
| 6,767,380 B2 * | 7/2004 | von Stackelberg, Jr. | 55/431 |
| 6,835,128 B1 * | 12/2004 | Olson | 454/232 |
| 6,849,100 B2 * | 2/2005 | Lim et al. | 55/385.2 |
| 6,997,977 B2 * | 2/2006 | Dallas et al. | 96/153 |
| 7,025,799 B2 * | 4/2006 | Peterson | 55/385.3 |
| 7,468,084 B2 * | 12/2008 | Bauer et al. | 55/385.2 |
| 7,527,663 B2 * | 5/2009 | Riedo | 55/385.2 |

(Continued)

FOREIGN PATENT DOCUMENTS

JP    5-231685    9/1993

*Primary Examiner* — Duane Smith
*Assistant Examiner* — Minh-Chau Pham
(74) *Attorney, Agent, or Firm* — Joseph M. Butscher; The Small Patent Law Group, LLC

(57) ABSTRACT

An air filtration system includes a housing that is interchangeably positioned within a plenum that is in fluid communication between the housing and a room. A fan is positioned within the housing and configured to draw contaminated air from the plenum. At least one filter member is positioned within the housing and configured to filter the contaminated air. A flexible duct is configured to channel filtered air from the housing to the room. The flexible duct is configured to enable the interchangeability of the housing.

30 Claims, 4 Drawing Sheets

U.S. PATENT DOCUMENTS

| | | |
|---|---|---|
| 7,547,350 B2 * | 6/2009 | Callahan et al. ............... 95/143 |
| 7,918,912 B2 * | 4/2011 | Tomlin et al. ............... 55/385.3 |
| 2002/0134061 A1 | 9/2002 | McGill |
| 2003/0015146 A1 | 1/2003 | Hawks |
| 2003/0213852 A1 | 11/2003 | Demster |
| 2004/0089157 A1 * | 5/2004 | von Stackelberg, Jr. ........ 96/406 |
| 2005/0011356 A1 | 1/2005 | Laiti |
| 2005/0186901 A1 * | 8/2005 | Moore, Jr. ................... 454/292 |
| 2005/0211415 A1 | 9/2005 | Arts |
| 2006/0060368 A1 | 3/2006 | Dinh |
| 2006/0174596 A1 | 8/2006 | Choi |
| 2009/0107090 A1 * | 4/2009 | Keel ............................ 55/385.4 |

* cited by examiner

AIR FILTRATION SYSTEM WITH QUICK CONNECT

CROSS REFERENCE TO RELATED APPLICATION

The present application relates to and claims priority from Provisional Application Ser. No. 61/311,974 filed Mar. 9, 2010, titled "AIR FILTRATION SYSTEM WITH QUICK CONNECT", the complete subject matter of which is hereby expressly incorporated by reference in its entirety.

BACKGROUND

The embodiments relate to an air filtration system and, more particularly, an air filtration system having a quick connect.

Clean rooms typically include a plenum extending above the room. The plenum is configured to contain air filtering systems necessary to receive contaminated air from a room and to supply filtered air to the room. A ceiling grid is positioned between the room and the plenum. The ceiling grid includes vents through which air is returned to and discharged from the plenum. A return vent returns contaminated air from the room to an air filtration system positioned within the plenum. The air filtration system supplies filtered air to the room through a supply vent.

The return vents and supply vents are positioned within the plenum. Existing structures within the plenum create obstacles for a duct system between the vents and the air filtration system. The air filtration system is also permanently positioned within the plenum. If a need arises to reconfigure the room, the ceiling grid must be replaced or reconfigured to accommodate new vents. Likewise, the air filtration system may require reconfiguring. Existing clean rooms do not allow interchangeability of the vents or air filtration system without reconstructing the room and plenum.

A need remains for improved systems and methods to provide an interchangeably positionable air filtration system.

SUMMARY OF THE INVENTION

In one embodiment, an air filtration system is provided. The system includes a housing that is interchangeably positioned within a plenum that is in fluid communication between the housing and a room. A fan is positioned within the housing and configured to draw contaminated air from the plenum. At least one filter member is positioned within the housing and configured to filter the contaminated air. A flexible duct is configured to channel filtered air from the housing to the room. The flexible duct is configured to enable the interchangeability of the housing.

In another embodiment, an air filtration system is provided. The system includes a plenum in fluid communication with a room. A housing is interchangeably positioned within the plenum and in fluid communication with the room. A fan is positioned within the housing and configured to draw contaminated air from the plenum. At least one filter member is positioned within the housing and configured to filter the contaminated air. A flexible duct is configured to channel filtered air from the housing to the room. The flexible duct is configured to enable the interchangeability of the housing.

In another embodiment, a method of providing an air filtration system for a room is provided. The method includes interchangeably positioning a housing with a plenum that is in fluid communication with the room. A fan is positioned within the housing to draw contaminated air through the plenum from the room. At least one filter member is positioned within the housing to filter the contaminated air. The filtered air is channeled through a flexible duct from the housing to the room. The flexible duct is configured to enable the interchangeability of the housing.

DETAILED DESCRIPTION OF THE DRAWINGS

Figure 1:
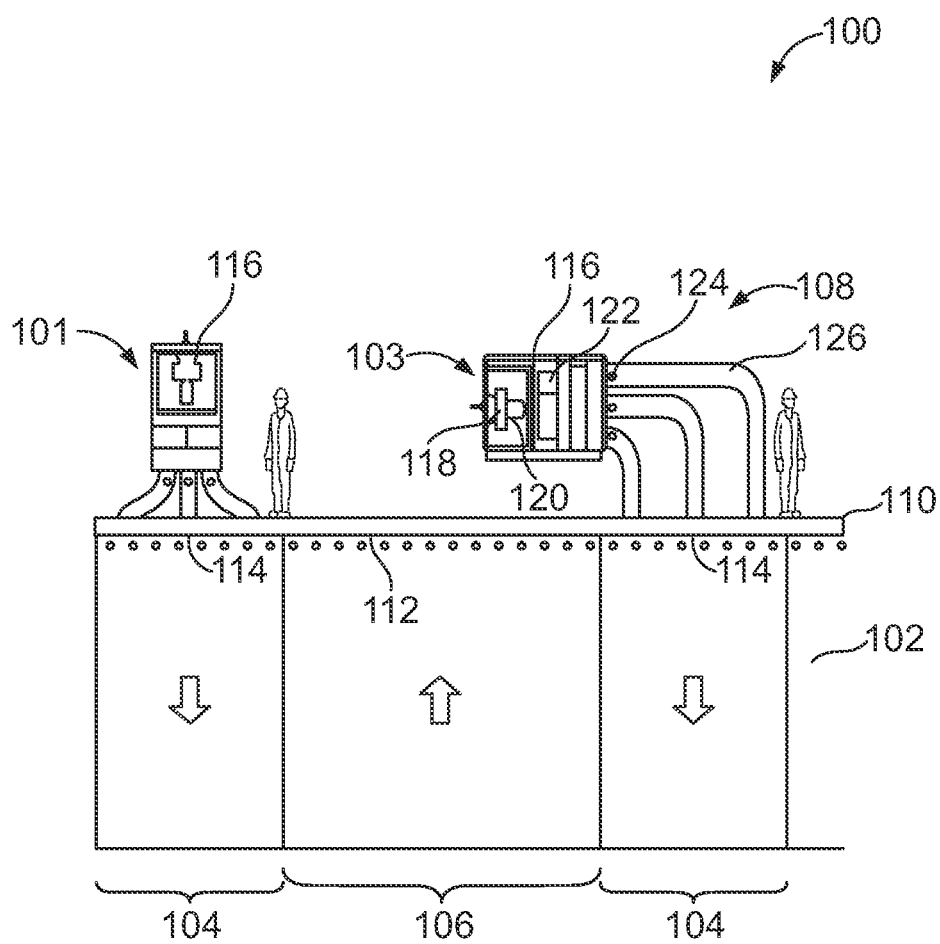
FIG. 1 is a front view of a filter system in accordance with an embodiment.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 is a view of a filter system 100 used to filter air in a room 102. The room 102 includes at least one supply area 104 and at least one return area 106. A plenum 108 is formed above the room 102. Optionally, the plenum 108 may be formed beneath the room 102 or within a wall of the room 102. The plenum 108 is isolated from the room 102 by a ceiling grid 110 projecting a length of the room 102 and plenum 108. The ceiling grid 110 is configured to support the weight of an individual so that the individual can walk through the plenum 108 to accommodate assembly and maintenance. The ceiling grid 110 may include return vents 112 in the return area 106 of the room 102. The ceiling grid 110 may also include supply vents 114 in the supply area 104 of the room 102. The return vents 112 channel contaminated air from the room 102 into the plenum 108. The supply vents 114 channel filtered air from the plenum 108 into the room 102.

At least one air filtration system 116 is positioned within the plenum 108. The air filtration system 116 is interchangeably positionable within the plenum 108. As illustrated, the air filtration system 116 may be vertically positioned 101 or horizontally positioned 103. A location of the air filtration system 116 is also interchangeable. The air filtration system 116 may be positioned within a space above the supply area 104 of the room 102. Optionally, the air filtration system 116 may be positioned at any location within the plenum 108. Additionally, the air filtration system 116 may be positioned remote from the plenum 108 and the room 102. The air filtration system 116 includes an open return 118, a fan 120, and at least one filter 122. The open return 118 may include a pre-filter. Optionally, the open return 118 does not include a pre-filter. The fan 120 draws contaminated air in the plenum 108 through the open return 118. In the exemplary embodiment, the contaminated air flows through the open space defined by the plenum 108. Optionally, the open return 118 may be coupled to the return vents 112 with a duct. In such an embodiment, the duct may be flexible to accommodate the interchangeable positioning of the air filtration system 116. The at least one filter 122 filters the contaminated air flowing through the air filtration system 116. In the exemplary embodiment, the at least one filter 122 is a HEPA filter. Optionally, the filter 122 may be any filter suitable for use with an air filtration system.

The air filtration system 116 also includes a housing 117 having a supply outlet 124. A duct 126 extends from the supply outlet 124 to the supply vents 114 of the room. The duct 126 is flexible to accommodate the interchangeable positioning of the air filtration system 116. The duct 126 accommodates interchangeably positioning the housing 117. The number of supply vents 114 positioned throughout the room 102 is dependant on the number of supply outlets 124 in the air filtration system 116. Each supply outlet 124 includes an individual duct 126 that extends to a supply vent 114. Alternatively, the ducts 126 may be bifurcated so that a single supply outlet 124 channels air to multiple supply vents 114. Optionally, at least one supply vent 114 within the room 102 may be sealed to accommodate a limited number of supply outlets 124. In another embodiment, at least one supply outlet 124 may be sealed to accommodate a limited number of supply vents 114. In the exemplary embodiment, a pair of air filtration systems 116 is illustrated within plenum 108. Any number of air filtration systems 116 may be utilized to accommodate the size of the room 102.

Figure 2:
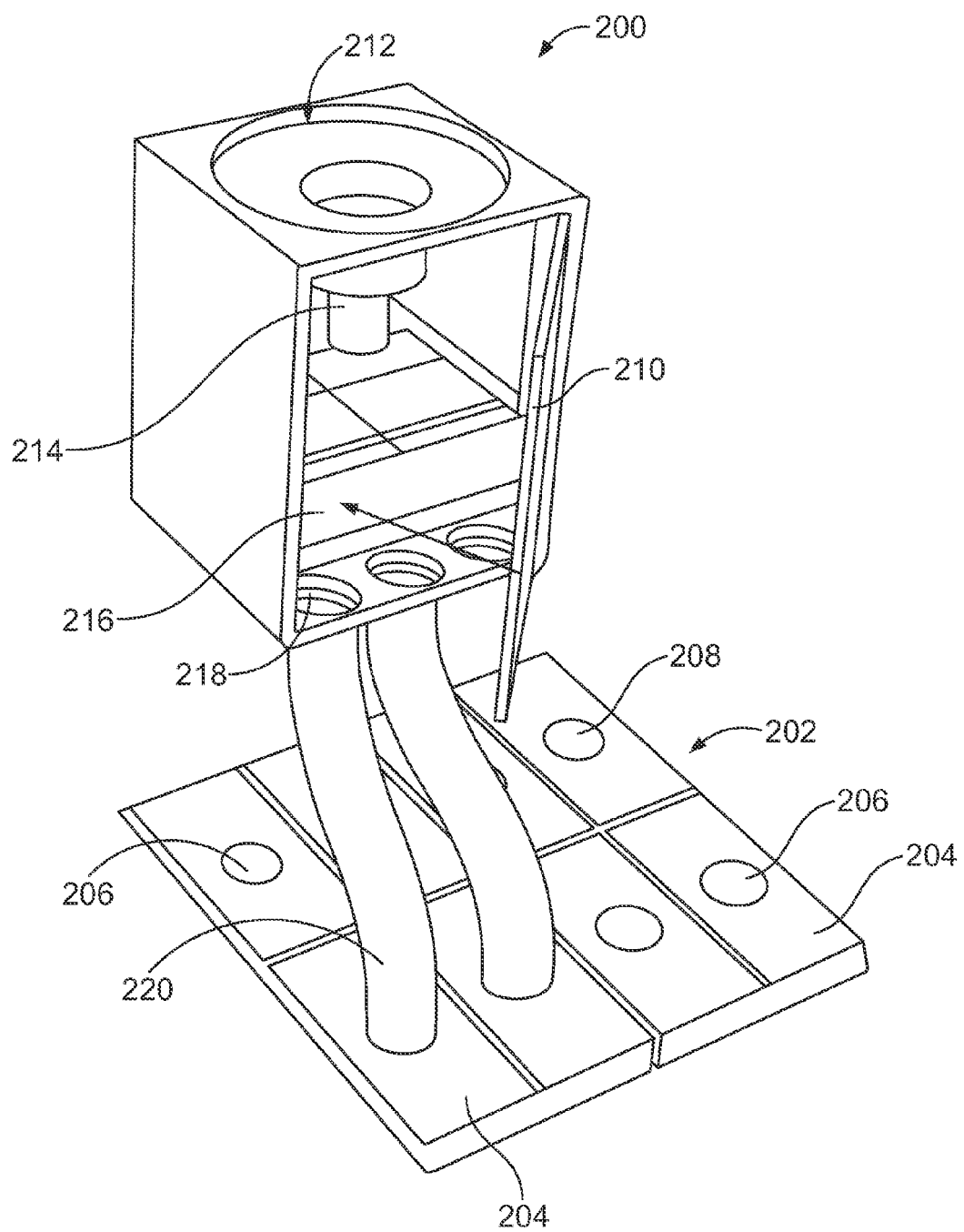
FIG. 2 is a front perspective view of an air filtration system in accordance with an embodiment.

FIG. 2 is a view of an air filtration system 200 coupled to a ceiling grid 202. The ceiling grid 202 includes a plurality of panels 204 positioned in rows. Each panel 204 includes a supply vent 206. The supply vent 206 has a circular configuration. Optionally, the supply vent 206 may have any shape that is suitable for receiving a duct. The supply vents 206 are illustrated in an open configuration. Optionally, if a supply vent 206, is not being utilized with the air filtration system 200, the supply vent 206 may be closed and sealed. A screen 208 is positioned beneath each panel 204. In the example embodiment, the ceiling grid does not include a filter. Optionally, a filter may be positioned between the panel 204 and the screen 208.

The air filtration system 200 includes a housing 201 having a door 210 that enables maintenance of the air filtration system 200. The door 210 is illustrated in an open position to show the components of the air filtration system 200. During operation, the door 210 would be in a closed position. The housing 201 of the air filtration system 200 includes an open return 212, a fan 214, and at least one filter 216. The open return 212 is illustrated without a pre-filter. Optionally, a pre-filter may be positioned within the open return 212. The fan 214 may be a centrifugal fan or a plenum fan. The air filtration system 200 is illustrated with a single fan 214. Optionally, the air filtration system 200 may utilize a fan array.

The air filtration system 200 also includes supply outlets 218. The supply outlets 218 are illustrated as being circular. Optionally, the supply outlets 218 may have any shape suitable for accommodating a duct. The supply outlets 218 are illustrated in an open configuration. Optionally, at least one supply outlet 218 may be closed and sealed. The fan 214 draws contaminated air from the environment surrounding the air filtration system 200 through the open return 212. Optionally, the fan 214 may draw air through an air duct. The contaminated air is filtered by the at least one filter 216 and discharged through the supply outlets 218.

A flexible duct 220 is coupled to each supply outlet 218. The flexible duct accommodates interchangeably positioning the air filtration system 200 with respect to the supply vents 206. Each duct 220 is coupled to a supply vent 206. Each supply outlet 218 includes an individual duct 220 that extends to a supply vent 206. Alternatively, the ducts 220 may be bifurcated so that a single supply outlet 218 channels air to multiple supply vents 206. The ducts 220 are configured to quick connect to both the supply vent 206 and the supply outlet 218. The quick connect feature is described in more detail below in FIGS. 3 and 4. The quick connect feature enables interchangeably positioning the air filtration system 200 with respect to the ceiling grid 202.

Figure 3:
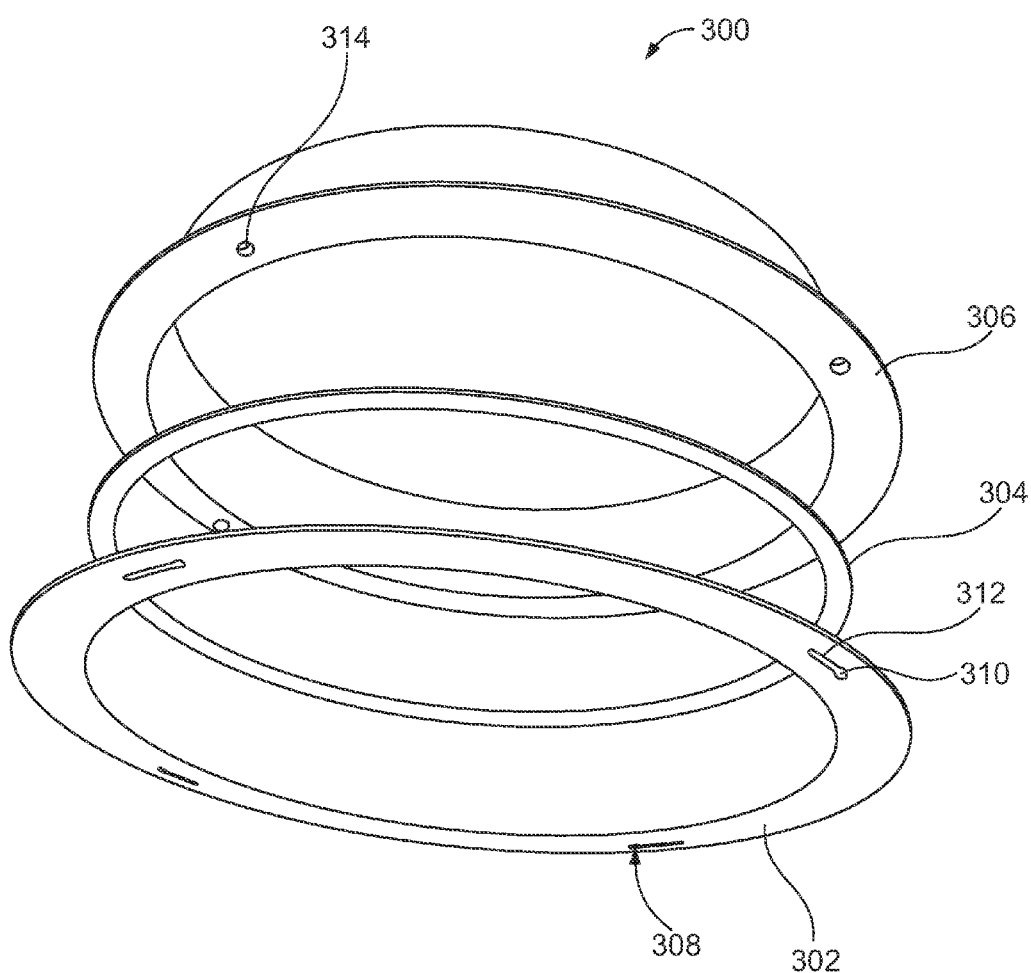
FIG. 3 is a bottom perspective view of a quick connect that may be used with the air filtration system shown in FIG. 2.

FIG. 3 is a view of a quick connect 300 that may be used with the air filtration system shown in FIG. 2. The quick connect 300 includes a female mating ring 302, a gasket 304, and a male mating ring 306. The female mating ring 302, the gasket 304, and the male mating ring 306 are formed in a circular configuration to accommodate a circular duct. Optionally, the female mating ring 302, the gasket 304, and the male mating ring 306 may be configured to accommodate any sized or shaped duct. The female mating ring 302 includes a plurality of slots 308. The slots 308 include a receiving end 310 and a retaining end 312. The male mating ring 306 includes a plurality of protrusions 314 sized for insertion into the receiving end 310 of the female mating ring 302.

The female mating ring 302 is configured to couple to a ceiling grid and/or an air filtration system. The male mating ring 306 is positioned on a duct and coupled to the female mating ring 302. The protrusions 314 are inserted into a receiving end 310 of a corresponding slot 308. The male mating ring 306 is rotated so that the protrusions 314 are secured within the retaining end 312 of the corresponding slot 308. Optionally, the male mating ring 306 may be secured to the female mating ring 302 by means of a screw, series of screws or other hardware fastening device. The gasket 304 is sealed between the female mating ring 302 and the male mating ring 304 to form an airtight interface.

Figure 4:
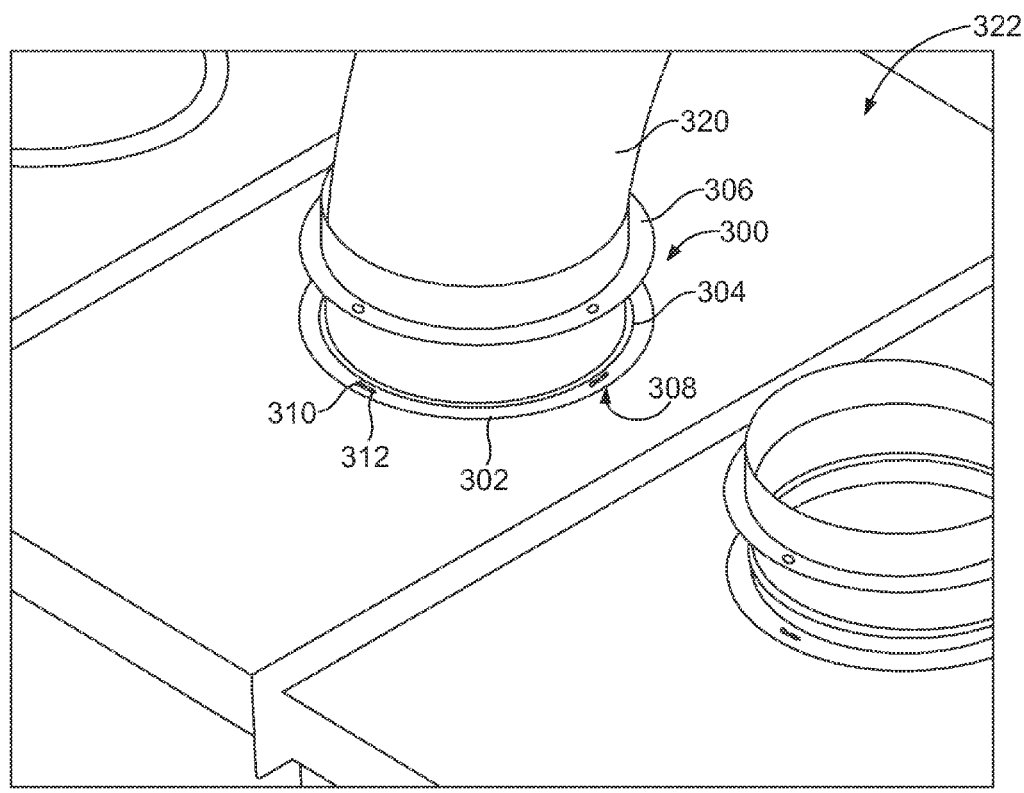
FIG. 4 is a top perspective view of the quick connect shown in FIG. 3 and used to secure a duct to a ceiling grid.

FIG. 4 is a view of the quick connect 300 used to secure a duct 320 to a ceiling grid 322. The female mating ring 302 is coupled to the ceiling grid 322. The female mating ring 302 forms an airtight interface with the ceiling grid 322. The female mating ring 302 may be coupled to the ceiling grid 322. Optionally, the female mating ring 302 is formed integrally with the ceiling grid 322. The gasket 304 is positioned on and centered with respect to the female mating ring 302. The male mating ring 306 is positioned around the duct 320. The male mating ring 306 is configured to position adjacent the female mating ring 302. The protrusions (shown in FIG. 3) of the male mating ring 302 are inserted into a receiving end 310 of a corresponding slot 308. The male mating ring 306 is rotated so that the protrusions are secured within the retaining end 312 of the corresponding slot 308. The gasket 304 is sealed between the female mating ring 302 and the male mating ring 304 to form an airtight interface.

The air filtration system and the quick connect described above enable interchangeable placement of the air filtration system with respect to a plenum. The air filtration system is positionable so as to avoid existing structures within the plenum. The flexible ducts are also configured to extend around existing structures. The quick connect feature enables the ducts to be easily removed and relocated through out the plenum. Additionally, the air filtration system is capable of being located remotely from the plenum and/or room. The example embodiments further enable relocating the filtering elements from the ceiling grid to the air filtration system to accommodate changes in the room and/or plenum.

The embodiments described herein are described with respect to a clean room environment. It should be noted that the embodiments described may also be used within an air handling unit. Optionally, the embodiments may be used in residential HVAC systems. Optionally, the embodiments may be used with precision air control systems, DX and chilled-water air handlers, data center cooling systems, process cooling systems, humidification systems, and factory engineered unit controls. Optionally, the embodiments may be used with commercial and/or residential ventilation products. The embodiments may also be used in the hood and/or inlet of the ventilation product.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An air filtration system comprising:
a housing that is interchangeably positioned within a plenum that is in fluid communication between the housing and a room;
a fan positioned within the housing and configured to draw contaminated air from the plenum;
at least one filter member positioned within the housing and configured to filter the contaminated air; and
a flexible duct configured to channel filtered air from the housing to the room, the flexible duct configured to enable the interchangeability of the housing.

2. The air filtration system of claim 1 further comprising a quick connect including a female ring having slots and a male ring having protrusions, the male ring coupled to the flexible duct and the female ring coupled to the housing, the slots configured to receive the protrusions to couple the flexible duct to the housing.

3. The air filtration system of claim 1 further comprising a quick connect including a female ring having slots and a male ring having protrusions, the male ring coupled to the flexible duct and the female ring coupled to a ceiling grid, the slots configured to receive the protrusions to couple the flexible duct to the ceiling grid.

4. The air filtration system of claim 3 further comprising a gasket positioned between the male ring and the female ring to form an airtight interface.

5. The air filtration system of claim 1 further comprising an open return, the fan configured to draw the contaminated air from the plenum through the open return.

6. The air filtration system of claim 1, wherein the interchangeability of the housing enables the air filtration system to be positioned within the plenum so as to avoid existing structures.

7. The air filtration system of claim 1 further comprising a quick connect that rotates about the flexible duct to couple the flexible duct to a ceiling grid.

8. The air filtration system of claim 1 further comprising a quick connect that rotates about the flexible duct to couple the flexible duct to the housing.

9. An air filtration system comprising:
a plenum in fluid communication with a room;
a housing interchangeably positioned within the plenum and in fluid communication with the room;
a fan positioned within the housing and configured to draw contaminated air from the plenum;
at least one filter member positioned within the housing and configured to filter the contaminated air; and
a flexible duct configured to channel filtered air from the housing to the room, the flexible duct configured to enable the interchangeability of the housing.

10. The air filtration system of claim 9 further comprising a quick connect including a female ring having slots and a male ring having protrusions, the male ring coupled to the flexible duct and the female ring coupled to the housing, the slots configured to receive the protrusions to couple the flexible duct to the housing.

11. The air filtration system of claim 9 further comprising a quick connect including a female ring having slots and a male ring having protrusions, the male ring coupled to the flexible duct and the female ring coupled to a ceiling grid, the slots configured to receive the protrusions to couple the flexible duct to the ceiling grid.

12. The air filtration system of claim 11 further comprising a gasket positioned between the male ring and the female ring to form an airtight interface.

13. The air filtration system of claim 9 further comprising an open return, the fan configured to draw the contaminated air from the plenum through the open return.

14. The air filtration system of claim 9, wherein the interchangeability of the housing enables the air filtration system to be positioned within the plenum so as to avoid existing structures.

15. The air filtration system of claim 9 further comprising a quick connect that rotates about the flexible duct to couple the flexible duct to a ceiling grid.

16. The air filtration system of claim 9 further comprising a quick connect that rotates about the flexible duct to couple the flexible duct to the housing.

17. A method of providing an air filtration system for a room, the method comprising
- interchangeably positioning a housing within a plenum that is in fluid communication with the room;
- positioning a fan within the housing to draw contaminated air through the plenum from the room;
- positioning at least one filter member within the housing to filter the contaminated air; and
- channeling the filtered air through a flexible duct from the housing to the room, the flexible duct configured to enable the interchangeability of the housing.

18. The method of claim 17 further comprising:
- coupling a male ring to the flexible duct, the male ring having protrusions; and
- coupling a female ring to the housing, the female ring having slots configured to receive the protrusions of the male ring to couple the flexible duct to the housing.

19. The method of claim 17 further comprising:
- coupling a male ring to the flexible duct, the male ring having protrusions; and
- coupling a female ring to a ceiling grid, the female ring having slots configured to receive the protrusions of the male ring to couple the flexible duct to the ceiling grid.

20. The method of claim 19 further comprising positioning a gasket between the male ring and the female ring to form an airtight interface.

21. The method of claim 17 further comprising drawing the contaminated air from the plenum through an open return.

22. The method of claim 17, wherein the interchangeability of the housing enables the air filtration system to be positioned within the plenum so as to avoid existing structures.

23. The method of claim 17 further comprising rotating a quick connect about the flexible duct to couple the flexible duct to a ceiling grid.

24. The method of claim 17 further comprising rotating a quick connect about the flexible duct to couple the flexible duct to the housing.

25. The air filtration system of claim 1, wherein the flexible duct includes a quick connect on an outer end thereof, wherein the quick connect is configured to be coupled to one of a plurality of supply vents in panels of a ceiling grid, wherein the quick connect is configured to be interchanged among the plurality of supply vents.

26. The air filtration system of claim 1, further comprising a ceiling grid including a plurality of supply vents formed in a plurality of panels, wherein the flexible duct includes a quick connect on an outer end thereof, wherein the quick connect is coupled to one of the plurality of supply vents, and wherein the quick connect is configured to be interchanged among the plurality of supply vents.

27. The air filtration system of claim 9, wherein the flexible duct includes a quick connect on an outer end thereof, wherein the quick connect is configured to be coupled to one of a plurality of supply vents in panels of a ceiling grid, wherein the quick connect is configured to be interchanged among the plurality of supply vents.

28. The air filtration system of claim 9, further comprising a ceiling grid including a plurality of supply vents formed in a plurality of panels, wherein the flexible duct includes a quick connect on an outer end thereof, wherein the quick connect is coupled to one of the plurality of supply vents, and wherein the quick connect is configured to be interchanged among the plurality of supply vents.

29. The method of claim 17, wherein the interchangeably positioning operation comprises switching a quick connect of the flexible duct among different supply vents in panels of a ceiling grid.

30. The method of claim 17, further comprising:
- providing a first mating fastener on an outer end of the flexible duct; and
- providing second mating fasteners on each of a plurality of supply vents formed in a plurality of panels of a ceiling grid,
- wherein the interchangeably positioning a housing operation comprises switching the first mating fastener among the second mating fasteners.

* * * * *